Patented Dec. 22, 1931

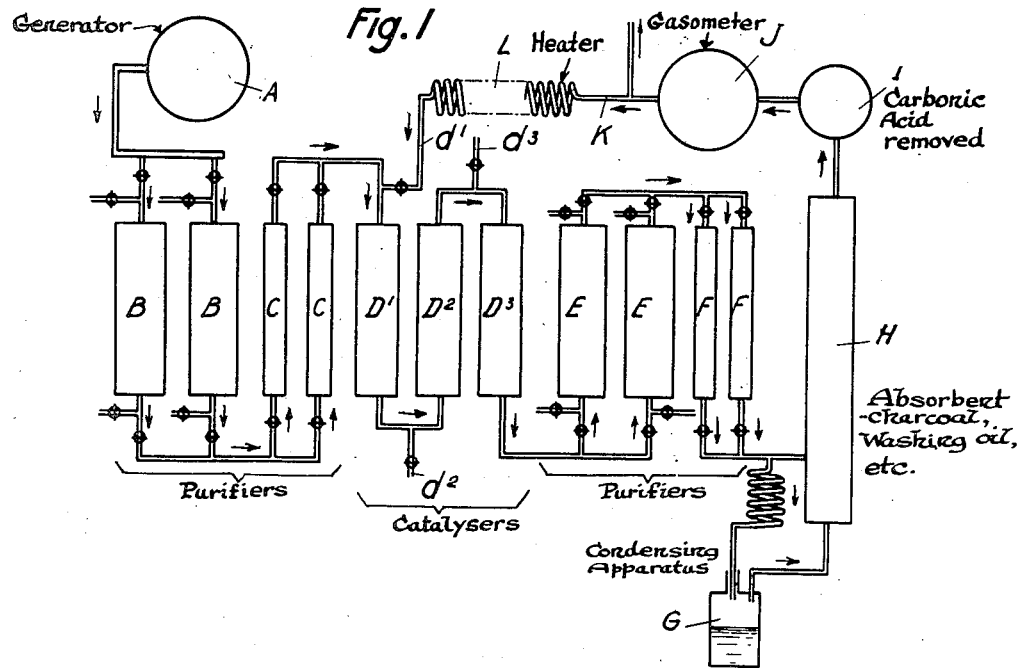
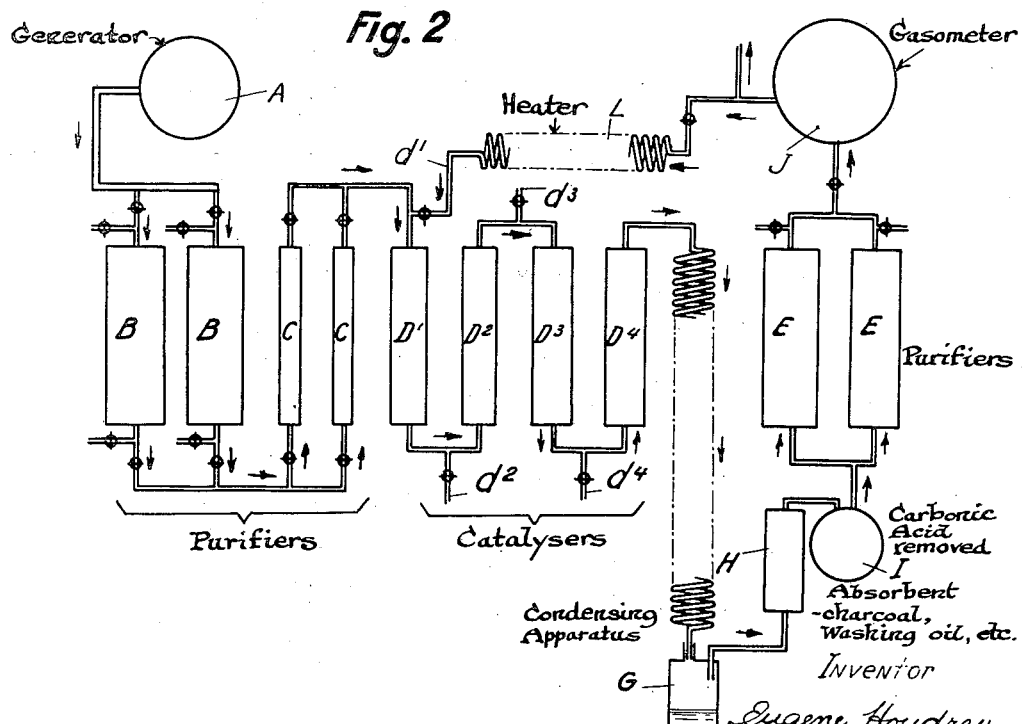

1,837,963

UNITED STATES PATENT OFFICE

EUGÈNE HOUDRY, OF PARIS, FRANCE, ASSIGNOR TO COMPAGNIE INTERNATIONALE POUR LA FABRICATION DES ESSENCES ET PETROLES, OF PARIS, FRANCE, A COMPANY OF FRANCE

PROCESS FOR THE MANUFACTURE OF LIQUID FUELS

Application filed November 5, 1928, Serial No. 317,348, and in France December 20, 1927.

The present invention relates to a process and apparatus for the manufacture of liquid fuels by treatment of gaseous masses in the presence of catalysts and hydrogen.

The treatment of gaseous masses derived more particularly from the distillation or the pyrogenation of combustibles of low value (lignites, shales, peats, etc.) or from tars, comprises in principle, on the issue from the gas generating apparatus, a catalytic purification designed to eliminate, as fully as possible, the mineral sulphur and the organic sulphur. The gases thus purified, consisting principally of hydrocarbons, are led into apparatus wherein, in the presence of active catalytic agents such as metals, mixtures of metals or alloys or oxides thereof, the heavy products are converted into lighter hydrocarbons and in most cases enriched with hydrogen by the addition, in such apparatuses of pure hydrogen or of hydrogen-containing gases purposely made or most generally of water gas and residual gases furnished by the final materials themselves.

Such treatment in the presence of catalysts at normal pressure has long been considered involving practically unsurmountable difficulty, for the reason that since the preliminary purification is not able to operate under ideally perfect conditions, the catalysts become rapidly contaminated, which leads to frequent regenerations, involving lengthy operations rendering impossible a continuous industrial process.

That is why with a view to augmenting the affinition of the bodies present, the treatment has been carried out under high pressures in the absence of catalysts. However, the processes which have recourse to this means require a delicate and complicated plant and do not avoid being dangerous.

The Compagnie Internationale pour la Fabrication des Essences et Pétroles have previously indicated how, whilst operating at normal pressure, they have succeeded in carrying out in a continuous manner, a purification at least very advanced, in retaining to the greatest extent possible the organic sulphur as well as the mineral sulphur.

For example, in the patent application filed in United States of America 14th May 1928 Serial No. 277,735, by Alfred Joseph, it has in particular been indicated how, by harnessing to the end of a plurality of batteries of purifiers alternately in period of activity and in period of regeneration, a check purifier of far less capacity and of a much longer period of activity, the possible limits of purification can be still further extended.

Now it results from work which I have recently carried out, that, when operating at suitable temperatures, in the apparatuses in the presence of catalytic agents, gaseous masses which have not been subjected to an ideally perfect desulphurization can be admitted to a certain extent with impurity, if care is taken to proceed in a continuous manner, with a regeneration of such catalytic agents.

If, for example, as catalytic agent pure nickel is employed, such metal will give rise to the formation of a sulphide with all the sulphur not retained by the purification. It will suffice constantly to reduce this sulphide, to the extent and measure of its formation, in order to ensure, at every instant, in a continuous manner, a regeneration of pure metal.

This result has already been partially obtained by feeding constantly with reducing gases, under the form of hydrogen, water gas or residual gas from a preceding operation, the various elements of the apparatus wherein is effected the catalysis in stages of gases and vapours previously purified.

That which I have precisely established, is that the additional gases play the double rôle of enriching gases and of gases serving to maintain permanent the catalytic agent in the active state. There is produced, in effect, constantly, for example with a catalyst of nickel, a reversible reaction.

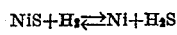

However, if this is true at the inlet and in the major portion of the catalytic apparatus, it is practically impossible to regulate the supply of hydrogen containing gas in a manner sufficiently precise to effect, at the same time as the synthesis enabling the desired light hydrocarbons to be obtained, the maintenance of the catalytic metal in the pure metallic state, without residue of sulphuretted hydrogen at the outlet. Otherwise stated, the lightened gases saturated with hydrogen, will necessarily carry over a little sulphuretted hydrogen at the outlet from the catalytic apparatus.

According to the present invention, which is to be seen in the practical utilization of the scientific observation above, there is disposed at the outlet from the apparatus wherein is effected at normal pressure, the enrichment in hydrogen in the presence of catalytic agents, a purifier which will permit the mass containing the synthetic fuels already formed, to be freed from the sulphur carried over in the remaining sulphuretted hydrogen, reformed in the course of the catalysis. In this purifier, having for example a base of copper, the $H_2S$ decomposes and the hydrogen set at liberty will be able to be taken back in part to the catalytic apparatus.

To sum up, the new process comprises a treatment with hydrogen in the presence of catalysts, interposed between two purifications; the preliminary purification is charged with retaining the mineral sulphur, and, to the fullest extent possible, the organic sulphur. In the course of the treatment in the presence of catalysts the remaining sulphur derived above all from the very stable thiophenes, form with the fresh enrichment gases, $H_2S$ which, in the presence of the metal catalyst, decomposes, produces a sulphide, which is immediately decomposed by the newly supplied fresh reducing gases. The remaining $H_2S$ escapes with the synthetic hydrocarbons, and the sulphur which it contains finds itself retained in the outlet purifier, the hydrogen set at liberty being able to be taken back in part to the catalytic apparatuses.

Diagrams of two examples of plants for carrying out the above described catalytic treatment are shown by Figures 1 and 2 of the accompanying drawings.

Referring to Fig. 1, the gaseous masses produced in an apparatus A pass, in a continuous manner, into batteries of inverse flow purifiers B which may contain nickel, for example. At the outlet from each battery of purifiers, wherein are retained, to the fullest extent possible, the mineral sulphur and the organic sulphur, the gases and vapours pass through a check purifier C which retains the traces of sulphur not retained in B. The whole B and C have preferably the form described and shown in detail in the specification of the above cited previous application. On leaving the check purifiers, the gaseous mass passes into catalytic apparatus $D^1$, $D^2$, $D^3$ disposed to receive, by pipes $d^1$, $d^2$, $d^3$ an addition of fresh hydrogen containing gas, which may be constituted, wholly or in part, by residual gas from a preceding operation.

According to the invention, the sulphuretted hydrogen, reformed in the catalytic apparatus passes into an outlet purifier, which, in the first example, is disposed immediately at the end of the catalytic apparatuses. This outlet purifier may comprise batteries of purifiers E containing copper for example followed, like the batteries of purifiers B, by check purifiers F. At the outlet from these check purifiers, the gaseous mass, formed then in the major part of enriched hydrocarbons condensible at normal pressure and temperature and of a certain quantity of non-condensible light hydrocarbons, is led, in the known manner, into an apparatus G, from which the non-condensible vapours pass into a retaining apparatus H, charged with an absorbent such as active charcoal or washing oil. The remaining gases, after passage through an apparatus I wherein they are dispossessed of the carbonic acid with which they are charged, pass into a gasometer J. A part of these gases can be led off by a pipe K and be taken back to the inlet element $D^1$ of the catalytic apparatus, after passage through a heater L which raises them to the temperature suitable for the reaction in the said element.

Referring to Fig. 2, the outlet purifier apparatus E, instead of being placed immediately to follow the catalytic apparatus $D^1$—$D^2$—$D^3$—$D^4$, is disposed at the end of the group G—H—I. The sulphuretted hydrogen reformed in the catalytic apparatus is here captured at the outlet of this group in order to purify the remaining hydrogen which at the outlet from the purifier E is led to the major extent into a gasometer J, the remainder being taken back into the circuit after passage through a heater L.

In both of the plants described above, the pressures throughout are preferably normal atmospheric pressures. The temperatures employed vary somewhat with the nature of the starting materials, and the following are given by way of example; throughout the purifiers before the catalytic reaction chambers, 300° to 350° C.; in the catalytic reaction chambers, 250° to 300° C.; and in the purifiers following the catalytic reaction chambers, 300° C. These temperatures are, however, approximate only and may vary within reasonable limits and with the nature of the starting materials.

It is obvious that the purifier apparatus at the inlet B—C like the purifier apparatus at the outlet E or E—F may be of any known type, that is to say they need not necessarily be in accordance with the particular purifiers forming the subject of the previous patents of the applicant.

The outlet purification E may be eventually effected in the cold, the residual gases being, in this case, necessarily reheated before their admission into the catalytic apparatus, as shown in Fig. 2.

According to another form of carrying out the invention. the batteries of catalysts are arranged to be alternately placed in periods of activity and regeneration; each plant comprises for this purpose, as a minimum, two batteries of catalysts mounted in parallel in the outlet pipe for the gaseous mass outside the inlet purifiers and in parallel, likewise on the outlet pipe for the gases going to the outlet purifiers, the series of cocks necessary, being obviously, provided in order to enable the various batteries to be put alternately out of circuit and into circuit, and to place them in connection with a source of regenerating agent (formic acid vapour for example), whilst they are out of the active circuit.

In such a way, by establishing suitable frequencies of activity and of regeneration by any known process, in situ, too long periods of active functioning at the end of which the activity of the catalytic agent would be too sluggish, can be avoided.

Claims:

1. A process for the treatment of hydrocarbon products in the vapor state which consists in preliminarily removing mineral and organic sulphur therefrom, thereafter passing said hydrocarbons at normal pressure through a plurality of catalytic conversion stages containing a metallic catalyst capable of forming a compound with any remaining sulphur and adding to said hydrocarbons when in contact with said catalytic material a reducing gas which decomposes said compound, whereby heavy hydrocarbons are converted throughout said plurality of stages to lighter hydrocarbons without contaminating said catalytic material with sulphur, again purifying said hydrocarbons after catalytic conversion is completed to remove any remaining traces of sulphur therefrom, and then condensing said hydrocarbons.

2. A process for the treatment of hydrocarbon products in the vapor state which consists in preliminarily purifying said hydrocarbons to remove sulphur compounds therefrom, thereafter passing said hydrocarbons at normal pressure through catalytic conversion stages containing a metallic catalyst capable of forming a compound with any remaining sulphur while adding to said hydrocarbons subsequently to the preliminary purification a reducing gas which decomposes said compound, whereby heavy hydrocarbons are converted to lighter hydrocarbons without contaminating the catalytic material with sulphur, again purifying said hydrocarbons after completion of the catalytic conversion to remove any remaining traces of sulphur therefrom, and then condensing the heavier fractions of said hydrocarbons and utilizing the lighter uncondensed fractions as a reducing gas in said catalytic conversion.

3. A continuous process for the treatment of hydrocarbon products in the vapor state which consists in preliminarily removing mineral and organic sulphur therefrom, thereafter passing said hydrocarbons at normal pressure in contact with a metallic catalyst capable of forming a compound with any remaining sulphur while constantly adding to said hydrocarbons subsequent to the preliminary purification a hydrogen-containing gas which decomposes said compound, whereby heavy hydrocarbons are converted to lighter hydrocarbons in the metallic catalyst zone, then removing any remaining traces of sulphur from said hydrocarbons and condensing the heavier fractions, then heating the uncondensed fractions, and then adding said heated uncondensed fractions to the hydrocarbons for the catalytic treatment.

In testimony whereof I have signed this specification.

EUGÈNE HOUDRY.